Oct. 11, 1960 L. GASKINS 2,955,627
HYDRAULIC TOOL
Filed Nov. 27, 1956
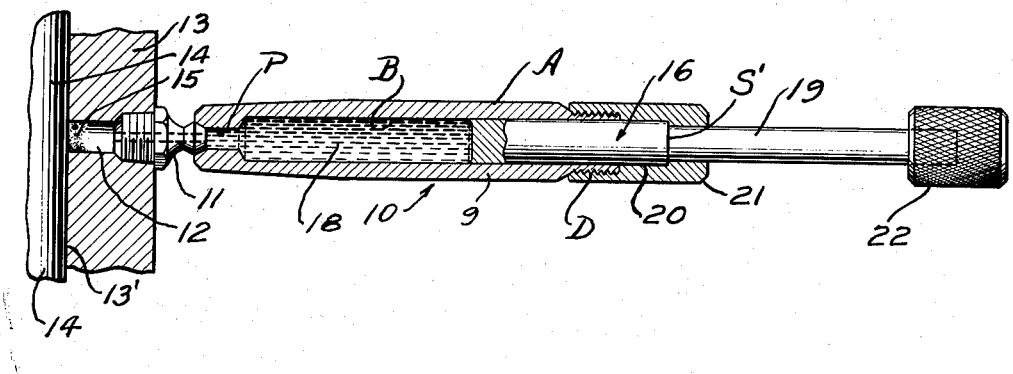
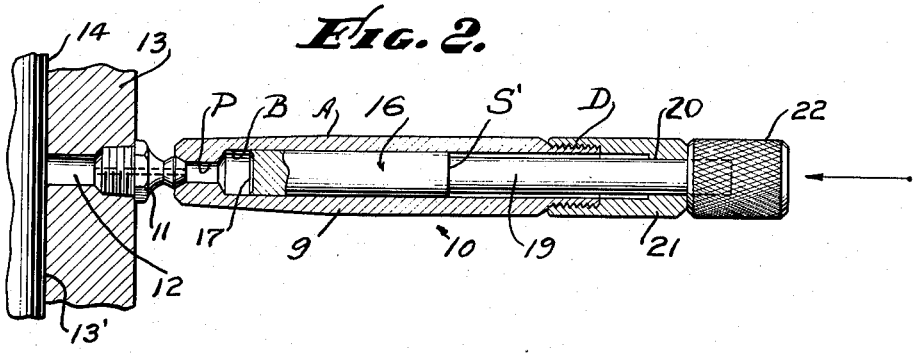
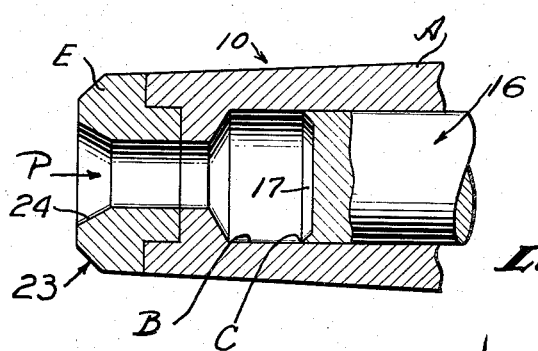
LUCIAN GASKINS
INVENTOR.
BY L. J. Larrabee
his ATTORNEY.

United States Patent Office 2,955,627
Patented Oct. 11, 1960

2,955,627

HYDRAULIC TOOL

Lucian Gaskins, Los Angeles, Calif.
(4425 Sandy Lane Road, Columbus 24, Ohio)

Filed Nov. 27, 1956, Ser. No. 624,694

1 Claim. (Cl. 141—311)

My invention relates to tools used in opening passageways in lubricating systems that are arranged to lubricate moving parts in machines of all types, as for instance, the journal bearings of shafts, and particularly is intended for use with such systems that have an oil hole provided with fittings (such as a Zerk or Alemite fitting) adapted to be engaged with a plunger operated oil or grease gun to force oil into the lubricating system.

Such oil hole fittings are often in positions exposed to dust-laden air, and many fittings are not provided with a dust cap, or if a cap was originally provided, it has been knocked off or become detached, thus permitting dirt, dust and other foreign particles to enter and clog the oil hole in the fitting or the lubricating passageway connected thereto.

The oil holes are often of considerable diameter and the fittings are formed with a passage through which a quantity of lubricant may be readily forced. Such lubricating arrangements, particularly those installed on motorized vehicles, such as automobiles, tractors, or the like, tend to become dirty, some of the surface dirt or dust accumulated therein or thereon, being carried or forced into the oil hole everytime a grease or oil gun is used on the fitting.

Since the direction of flow of the lubricant is always inward, there is no clearing action on the interior of the oil hole and fitting except that some of the particles of dust and dirt are forced into the bearing, a considerable number of the particles, however, tending to accumulate in the hole against the surface of the part turning in the journal and in time making it difficult, and many times practically impossible, to get any lubricant to the surface of the part to be lubricated by the force which can be exerted by a hand or pressure operated gun, without unscrewing the fittings commonly positioned over the oil hole and clearing it with a piece of wire, and in many instances the passageway cannot be effectively opened by such method.

By experiment, it has been proven that a heavy blow exerted upon the piston of a hand operated oil or grease gun constructed according to my invention while it is held against the inlet of the passageway of the lubricating system or against the fitting connected thereto, will be effective to break up the accumulation of particles and force them into the small clearance between the surface of the journalled part and the surface of the bearing, the particles being gradually worked out of the bearing by the periodic lubrication given the bearing in normal maintenance.

It is the general object of my invention to provide a novel hand tool which may be operated by a hammer blow to clear clogged lubricant passageways, of the kind described, without the necessity of unscrewing the fitting and later replacing it, or being required to previously clear such passageways with a wire or other tool.

It is a particular object of my invention to provide a novel small readily handled tool of simple and durable construction, capable of satisfactory service for an indefinite period, for clearing clogged oil passageways.

Another object of my invention is to provide a novel tool for the purpose described and which may be subjected to rough service without liability of becoming damaged or broken, and which tool includes only one moving part.

A further object of my invention is to provide a novel tool by which a body of liquid, such as heavy oil, may be suddenly applied with considerable force to a plug of dust accumulated in an oil passageway to break up the plug and force the oil into bearing surfaces connected to the oil passageway without danger of any part of the tool becoming dislodged or oil being projected under pressure around the tool.

A still further object of my invention is to provide a novel hand tool to clear clogged oil passageways and which is simple, easy to manufacture from standard materials, and inexpensive to produce.

Yet another object is to provide a novel, simple and easily operated hand tool whereby an extremely high hydraulic force or pressure may be exerted upon an inlet to a passageway, particularly passageways in lubricating systems, so as to easily, quickly and effectively clear said passageway of foreign elements that tend to obstruct and prevent the free flow of lubricant into and through said passageway.

Other objects, advantages and features of invention may appear from the accompanying drawing, the subjoined detail description, and the appended claim.

The accompanying drawing illustrates the invention in a form I at present deem preferable.

Figure 1 is a longitudinal view of the tool of my invention shown partly in section, the piston being shown in retracted position and the tool charged with liquid for clearing the passageway of a lubricating system with which the tool is shown associated.

Fig. 2 is a view similar that that of Fig. 1 but showing the piston in forward position at the termination of an oil passage clearing operation, and with the liquid not being shown, to more clearly illustrate the parts.

Fig. 3 is a fragmentary axial sectional view on enlarged scale of the forward end of the tool with the piston at the forward position in the tool body.

In the drawing and referring first to Fig. 1, the numeral 10 indicates generally the tool of my invention which is shown positioned with its forward end against a nipple fitting 11 (of the Zerk type) screwed into the outer or inlet end of a passageway 12 for a lubricating system that is usually drilled in a bearing member 13.

The passageway 12 terminates against the surface of a member 14 journaled, for either sliding or turning movement in the bore or bearing 13' of bearing member 13.

In Fig. 1 the passageway 12 has shown therein an obstruction 15, that may be the result of accumulations of dust or dirt particles therein and which may enter the usual opening in the fitting 11 and adhere to walls of the passageway and the lubricant therein. This obstruction 15 may form at any portion along the passageway 12 from the inlet thereof to the surface of the member 14 journaled in bearing 13' of bearing member 13, rather than at the bottom of passageway 12, as shown.

The obstruction 15, in many instances, forms a relatively hard and dense body, due to the evaporation of the lubricant, thereby presenting an obstacle in the passageway 12 and rendering it difficult, if not practically impossible, to force any lubricant to the bearing 13' by the use of the usual lubricating tools or grease guns heretofore and customarily used.

It is the main purpose and primary function of my novel tool 10 to dislodge such obstruction 15, and by using my hydraulic tool 10 I force a liquid, such as oil, under high pressure into the passageway 12 and against the plug of dirt or dust or obstruction 15 to dislodge and disperse the same.

The tool 10 comprises an elongate body member A having an axial passage or bore B in which a piston 16 has a close sliding fit toward the forward end thereof.

The bore B is slightly increased in diameter or tapered approximately .002" toward its rearward end from the forward end to provide a free sliding fit for the piston 16 therein. Preferably the forward face of the piston is dished or recessed as indicated at 17, and terminates in a knife-like edge C at the outer periphery of piston 16. The diameter and the length of the piston 16 is sufficient to provide an ample bearing surface for longitudinal sliding movement of piston 16 in bore B and the edge C of the dished forward edge C of piston 16 will minimize loss of pressure under which liquid, such as the lubricant, shown at 18, is placed when the piston is subjected to a heavy blow by a hammer. Such dished forward edge C tends, upon forward movement of piston 16, to force liquid in bore B forward and prevent such liquid from escaping between the piston and the wall of the bore B in body member A, and as the edge C of the piston moves forwardly in the bore B, the space around the piston 16 is diminished to further aid in preventing such escape of liquid.

The rearward portion 19 of the piston 16 is of reduced or lesser diameter than the forward portion thereof, and such reduced portion 19 forms a shoulder S' therewith and extends through an opening 20 at the rear end of tool 10 and provides a free sliding fit of the piston therein. Preferably, the rearward portion or closure member 21 of body 10 is formed as a separate part which may be screw threaded onto the main portion 9 of the body, as at D.

The projecting end 19 of piston 16 is intended to be hit with a hammer, and to provide a suitable surface to withstand hammer blows without deformation, I provide an impact receiving member 22 in the form of a knurled block that preferably has a press-fit or is otherwise securely mounted on the outer end of portion 19 of the piston 16. Member 22 also serves to provide a finger grip to pull or move the piston 16 rearwardly in the body A when charging the tool with liquid.

As shown in Fig. 3, the nose portion 23 of the tool body A may be formed as a separate member E with the forward end 24 of the passage P therein shaped to fit on, and receive in close contact, lubricating fittings of different form so that a number of tools could be provided having identical construction except for the nose portions, thus facilitating the manufacture of the tools to adapt them for association and use with fittings 11 that may be of different exterior configuration.

It will be noted that the passage P in the nose portion of the body member A is of smaller diameter than the bore B whereby pressure of the liquid in the bore may be "built up" and ejected from the axial passage in the body member A in the form of a high pressure jet.

When a mechanic is confronted with an oil hole or passageway that is clogged and is required to be cleaned out before being able to force lubricant therethrough with the usual lubricating apparatus or grease guns; such passageway may be easily and quickly cleared by a tool constructed according to my invention, which is then charged with a suitable type of liquid, such as oil, from the transmission or rear end of an automobile, by simply immersing the nose portion 23 of the tool 10 in the oil with the piston in forward position in the body, and then pulling the piston rearwardly by the operator gripping and pulling outwardly on part 22, and thus drawing a charge of liquid into the bore B; the nose of the tool is then engaged with the fitting 11, as shown in Fig. 1.

Then the operator, while holding the tool firmly pressed against the fitting 11 with one hand, delivers a sharp and hard blow with a hammer axially onto the impact receiving part 22 of the tool. The piston 16 has little resistance to its forward movement until the liquid in bore B is fully compressed, at which time the full thrust of the blow is transmitted to the liquid in the bore which is driven as a high pressure jet against the obstruction 15, dislodging and disintegrating the obstruction, and as the oil hole 12 becomes filled with liquid under high pressure the oil and foreign particles forming the obstruction 15 are forced out of the passageway and between the bearing surfaces.

It is to be noted that since the forward end 24 of passage P in the nose portion 23 of the tool seats accurately onto the outer end of the fitting, no squirting of oil under pressure from the tool occurs.

In the event the piston rebounds from the blow of the hammer, full outward movement of the piston from the body member 10 is prevented by the shoulder S', which is formed by the reduced portion 19 with the forward portion of piston 16, engaging the inner surface of the closure member D adjacent and surrounding the opening 20 therein.

While I have specifically described and shown embodiments of the invention at present deemed preferable by me, it is to be understood that changes in the described embodiments may be made by those skilled in the art without departing from the scope of the invention as defined by the appended claim.

I claim:

A hydraulic tool comprising an elongate body member having at one end a front nose portion being so shaped and constructed as to fit on, and receive in close contact, a lubricant fitting; said member being provided with a bore and at one end with an axial passage through said nose portion for the emission of liquid from said bore to said lubricant fitting; a closure member removably secured to the other end of said body member and being provided with an axial opening at its outer end; a piston slidable in said bore and having a reduced portion extending outwardly through said axial opening, and forming a shoulder to engage the said closure member and prevent said piston from being withdrawn from said bore when said closure and body members are secured together; said piston having its forward face dished and terminating in a substantially knife-like edge at the outer periphery of said piston; and said bore in the body member being of such diameter that said knife-like edge of said piston has a close sliding fit therein at the front end of said bore, and said bore being outwardly tapered toward the rear end thereof.

References Cited in the file of this patent

UNITED STATES PATENTS

| | | |
|---|---|---|
| 1,379,041 | Pulliam | May 24, 1921 |
| 1,932,796 | McNaught | Oct. 31, 1933 |
| 1,945,555 | Kreidel | Feb. 6, 1934 |
| 2,128,254 | Kile | Aug. 30, 1938 |
| 2,236,727 | Dewees | Apr. 1, 1941 |
| 2,430,718 | Jacobson | Nov. 11, 1947 |

FOREIGN PATENTS

| | | |
|---|---|---|
| 106,516 | Switzerland | Aug. 16, 1924 |
| 709,563 | Germany | Aug. 20, 1941 |
| 847,798 | Germany | Aug. 28, 1952 |